United States Patent
Butler

[15] 3,666,318
[45] May 30, 1972

[54] OPENING ROOF FOR VEHICLES
[72] Inventor: James Butler, Kempsey, England
[73] Assignee: Weathershields Limited, Birmingham, England
[22] Filed: May 21, 1970
[21] Appl. No.: 39,474

[30] Foreign Application Priority Data
May 23, 1969 Great Britain ...................... 26,338/69

[52] U.S. Cl. ...................................... 296/137 C
[51] Int. Cl. ...................................... B60j 7/10
[58] Field of Search ...................... 296/137 R, 137 C, 137 D

[56] References Cited
UNITED STATES PATENTS
1,950,371  3/1934  Bair ..................................... 296/137 C
2,991,094  7/1961  Bair ..................................... 296/137 R FOREIGN PATENTS OR APPLICATIONS
514,269  9/1952  Belgium ........................... 296/137 D Primary Examiner—Benjamin Hersh
Assistant Examiner—Robert R. Song
Attorney—Scrivener, Parker, Scrivener and Clarke

[57] ABSTRACT

In a vehicle opening roof a longitudinally extending roof opening is adapted to be closed by a fabric covering fixed at its rear end to the roof and supported by a number of cross-members which are guided in guide flanges extending along each side of the opening. Releasable stop means incorporated for holding the covering in an intermediate open position are resiliently urged into engagement with a part of one cross-member to maintain the covering rearwardly of that cross-member in close contact with the roof.

8 Claims, 4 Drawing Figures

OPENING ROOF FOR VEHICLES

SPECIFIC DESCRIPTION

This invention relates to opening roofs for vehicles such as saloon cars of the kind in which a flexible fabric covering is supported by a number of slidably mounted cross-members which are guided at their ends in guide flanges or rails extending along each side of a longitudinal opening in the roof, one end of the covering being fixed to the roof at a corresponding end of the opening, usually the rear end, and the flexible covering being normally movable manually between a closed position in which the opening is covered and an open position in which substantially the complete opening is exposed.

According to our invention in an opening roof of the kind set forth stop means are provided for holding the flexible covering in an intermediate open position, the stop means being resiliently urged into engagement with a part of one of the cross-members to maintain the longitudinal sides of the portion of the fabric covering between that point of the engagement and the fixed end of the covering in close contact with the roof, and the stop means being releasable from engagement with that part to permit the covering to be moved into the open position.

Preferably, the stop means comprise two stop assemblies each located at one side of the longitudinal opening and adapted to engage with a part of the said one cross-member which faces the fixed end of the covering.

Preferably the covering is fixed at its rear end to the roof at the rear end of the opening and the portion of the covering rearwardly of the point of engagement of the stop means and the rear end of the covering is in close contact with the roof.

To ensure that the portion of the covering rearwardly of the point of engagement with the stop means is held in close contact with the roof, the said one cross-member and the cross member or members between it and the fixed end of the fabric covering are attached to the fabric throughout the axial length of the members.

This ensures that when the covering is in the intermediate position the portion of the covering rearwardly of the said one cross-member is unable to move relative to the said one cross-member. Thus flapping of that portion relative to the roof is prevented and draughts over the area of the opening enclosed by that portion, and rearwardly of the front seats of the vehicle, are substantially eliminated.

The fabric covering is conveniently attached to the cross-members by the threading of the cross-members through loops on the underside of the covering. Where there is a head lining as well as the covering, the cross-members are threaded through loops on the underside of the covering alternating with loops on the upper side of the head lining.

One embodiment of our invention is illustrated in the accompanying drawings in which.

Figure 1:
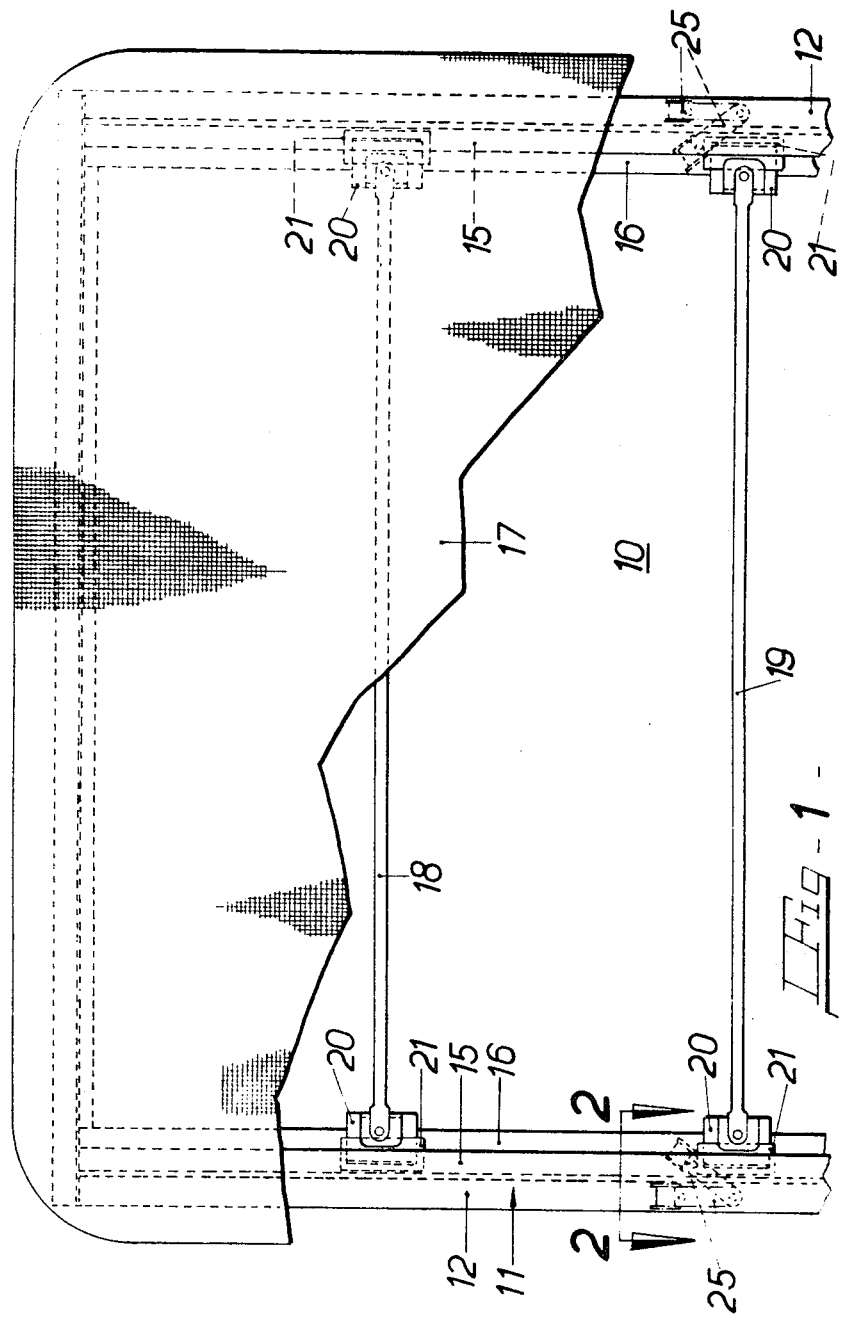
FIG. 1 is a plan view of the rear portion of a vehicle opening roof with a portion of the flexible fabric covering omitted for clarity.

In the opening roof illustrated in the drawings 10 is a longitudinal opening in the roof of a vehicle. The opening 10 is rectangular and extends for substantially the full length of the roof. A water check frame 11 extends along each side of the opening 10 and across the front and comprises parallel side members 12 and a front end member (not shown). The side members 12 of the watercheck frame 11 are of H section and include a pair of outwardly extending parallel flanges 13 between which is secured a portion 14 of the roof at that side of the opening 10, and a pair of inwardly extending parallel flanges 15 and 16 of which the lowermost flange 16 is of greater length than the flange 15.

A flexible fabric covering 17 for the opening 10 is supported by a series of cross-members of which only two are indicated at 18 and 19. The cross-members 18 and 19 are slidably guided at opposite ends on the flanges 16 of the side members 12. Each of the slidably guided cross-members is formed by a length of tube of circular or other convenient cross section. The ends of the tube are flattened, and a short distance in from each end a depending bracket 20 is secured to the cross-member and carries a runner 21 of synthetic plastics material, suitably polypropylene, engaging slidably with the guide flange 16.

Figure 4:
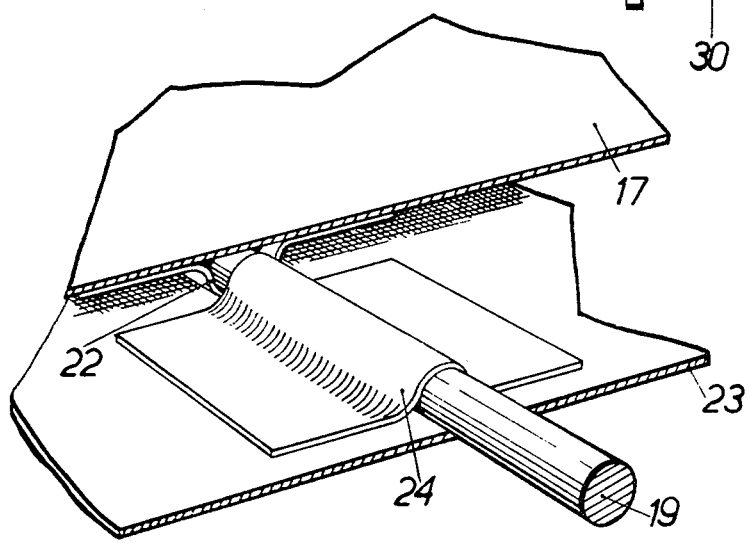
FIG. 4 is a perspective view showing a connection between a cross-member, the head lining and the flexible fabric covering of the roof.

It will be appreciated that all the cross-members are curved to conform to the transverse curvature of the roof and are threaded through loops 22 which are secured to the underside of the fabric covering 17. As illustrated in FIG. 4 when there is a head lining 23 as well as the fabric covering 17, the cross-members are threaded through the loop 27 alternating with loop 24 on the upper side of the head lining 23.

The fabric covering 17 is of a greater width than the roof opening 10, so that its side edges overlap the roof at each side of the opening 10, and the rear end of the fabric covering 17 is secured to the roof at the rear end of the opening 10. The fabric covering 17 is movable manually in a rearward direction to expose substantially the complete opening 10 by sliding the front cross-member rearwardly on the flange 16 which in turn slides each of the remaining cross-members in the same direction. To cover the opening, the front cross-member is moved manually towards the front of the roof until it abuts against front end member of the watercheck frame to which is releasably latched by suitable manually operable means (not shown).

Figure 2:
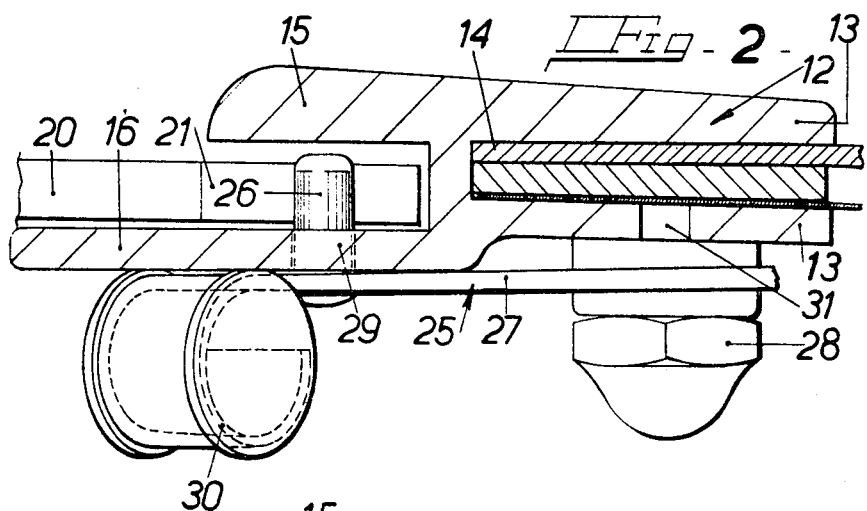
FIG. 2 is a section of the line 2—2 of FIG. 1 showing stop means in an operative position.
Figure 3:
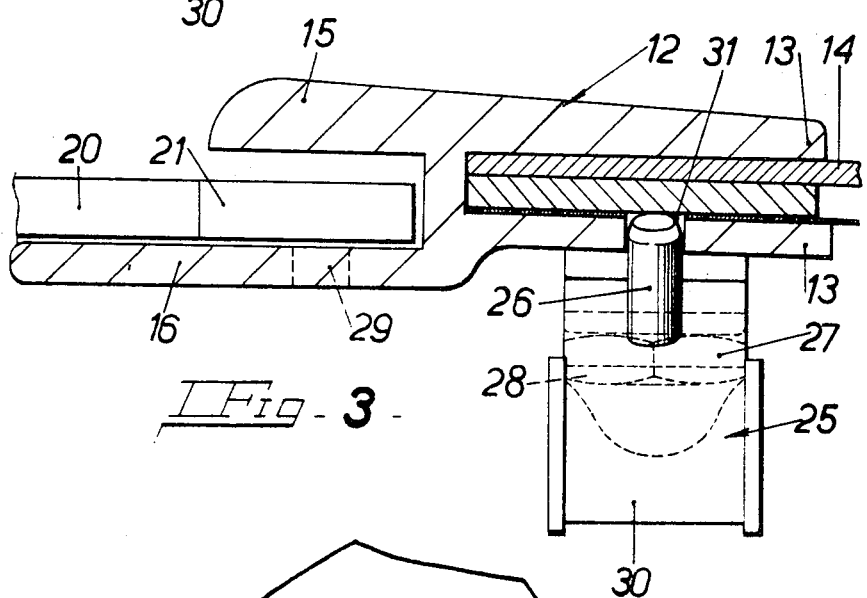
FIG. 3 is a section similar to FIG. 2, but showing the stop means in an inoperative position.

The flexible covering may be held in an intermediate open position by stop means in accordance with our invention. As illustrated in FIGS. 1 to 3 of the accompanying drawings a stop assembly 25 is provided at each side of longitudinal opening 10. Each stop assembly 25 comprises an upstanding pin or peg 26 mounted adjacent to the free end of a resilient strip of metal 27 in a position normal to the plane of the strip 27. The other end of the strip 27 is anchored for rotational movement in a mounting, conveniently a screw and washer assembly 28, fixed in the lower outwardly extending flange 13 of the watercheck frame side member 12. In its operative position the pin or peg 26 projects upwardly through an opening 29 in the guiding flange 16 at a position spaced slightly rearwardly from, or closely adjacent to, the rear edge of the cross-member 19. Thus the pin or peg 16 projects into the path of the cross-member 19 to engage substantially with its rearmost edge. The pin or peg 26 is held in that position due to the resilient of the metal strip 25.

The pins or pegs 26 form stops preventing rearward movement of the cross-member 19 and portion of the fabric covering 17 rearwardly of the cross-member 19. Thus, with the pins or pegs 26 in their operative positions the fabric covering 17 can be moved rearwardly to uncover a front portion of the opening 10 only. The portion of the fabric covering 17 to the rear of the cross-member 19 is unable to move rearwardly. Since the cross-member 18 and 19 are coupled to the fabric covering 17 for the whole of their lengths, flapping of the portion of the fabric covering 17 to the rear of the cross-member 19 is prevented and draughts over the area of the opening 10 which is enclosed by that portion, normally positioned to the rear of the front seals of the vehicle, are substantially eliminated.

When it is desired to uncover substantially the complete opening 10, the pins or pegs 26 are withdrawn from their engagements in the openings 29 against the resilience of the strip 27 by applying a downwardly directed force to finger pieces 30 at the free ends of the strips 27. The strips 27 are then moved angularly in outward directions through small arcs about the mountings 28 as axes into inoperative positions in which the pins or pegs are received in openings 31 in the lowermost outwardly extending flange 13 of the watercheck frame side members 12, as shown in FIG. 3.

I claim:

1. In an opening roof for a vehicle including a flexible fabric fixed at one end to a corresponding end of a longitudinal opening in the roof of a vehicle and adapted to be moved manually between a closed position in which the opening is covered and an open position in which substantially the complete opening is exposed, a guide flange extending along each side of said opening, and a number of cross-members supporting said flexible covering and guided at opposite ends in said guide flanges the improvement comprising stop means movably mounted on said guide flange for holding said flexible covering in a position intermediate said open and closed positions, resilient means incorporated in said stop means for urging said stop means into engagement with a part of one of said cross-members to maintain in close contact with the roof longitudinal sides of that portion of said fabric covering lying between the point of engagement of said stop means with said one cross-member and said fixed end of said flexible covering, and manually operable means for moving said stop means with respect to said guide flange into an inoperative position whereby said flexible covering can be moved into said open position.

2. The improvement as claimed in claim 1, wherein said stop means comprises two stop assemblies adapted to engage with parts of said one cross-member which face said fixed end of said covering and each of said stop assemblies is located at one side of said longitudinal opening.

3. The improvement as claimed in claim 1, wherein said stop means comprises two stop assemblies and each stop assembly is located at one side of said longitudinal opening, each stop assembly comprising an upstanding pin, a mounting carried by said guide flange, a resilient strip carrying said pin and anchored for rotational movement in said mounting about an axis normal to the plane of said flange, said strip being angularly movable about said axis between an operative position, in which said pin projects through an opening in said flange into the path of movement in a direction towards said fixed end of said covering of said one cross member to act as a stop preventing movement of said one cross-member in that direction, and an inoperative position spaced outwardly from said flange opening, after said pin has been withdrawn from said flange opening against the loading of said resilient strip.

4. The improvement as claimed in claim 3, wherein said flanges upon which said cross-members are guided are incorporated in parallel side-members of a water check frame, and at a point outwardly from said flange opening in which said pin is received in said operative position, each side-member is provided with an opening in which said pin or peg is received when in its inoperative position, said opening in said side member lying on an arc containing the center of said flange opening and having its center at the axis of rotation of said strip by which said pin is carried.

5. The improvement as claimed in claim 1, including means for fixing said fabric covering at its rear end to said roof at the rear end of said longitudinal opening whereby the portion of said covering rearwardly of said point of engagement and said rear end of the covering is in close contact with said roof.

6. The improvement as claimed in claim 5, wherein said one cross-member and at least one other cross-member located between said one cross-member and said fixed end of said fabric covering are attached to said fabric throughout the axial length of said cross-members.

7. The improvement as claimed in claim 6, wherein said fabric covering is attached to said cross-members by means of loops on the underside of said fabric covering through which said cross-members are threaded.

8. The improvement as claimed in claim 6, including a head lining, wherein said fabric covering and said head lining are both attached to said cross-members by means of loops on the underside of said covering and loops on the upper side of said head lining through which said cross-members are threaded alternately.

* * * * *